(12) United States Patent
Naruse

(10) Patent No.: US 6,498,584 B2
(45) Date of Patent: Dec. 24, 2002

(54) GPS RECEIVER AND METHOD THEREOF

(75) Inventor: Tetsuya Naruse, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/772,173

(22) Filed: Jan. 29, 2001

(65) Prior Publication Data

US 2001/0010505 A1 Aug. 2, 2001

(30) Foreign Application Priority Data

Jan. 31, 2000 (JP) ........................................ 2000-027350

(51) Int. Cl.[7] ................................................. G01S 5/14
(52) U.S. Cl. .................................................. 342/357.12
(58) Field of Search ....................... 342/357.12, 357.06; 455/78

(56) References Cited

U.S. PATENT DOCUMENTS

| | | | | |
|---|---|---|---|---|
| 5,081,462 A | * | 1/1992 | Tachita et al. .............. | 342/352 |
| 5,301,368 A | * | 4/1994 | Hirata ......................... | 455/78 |
| 5,949,374 A | * | 9/1999 | Nelson, Jr. ............. | 342/357.15 |
| 6,178,195 B1 | * | 1/2001 | Durboraw, III et al. . | 342/357.12 |
| 6,295,023 B1 | * | 9/2001 | Bloebaum .............. | 342/357.06 |
| 6,327,473 B1 | * | 12/2001 | Soliman et al. ............. | 455/456 |

* cited by examiner

*Primary Examiner*—Gregory C. Issing
(74) *Attorney, Agent, or Firm*—Jay H. Maioli

(57) ABSTRACT

In a signal receiver of GPS and a demodulation processing control method, since satellite signals to be transmitted respectively from multiple GPS satellites in the GPS system are received and the demodulation processings of satellite signals by the demodulator are time division controlled by the control circuit based on the demodulation timing with respect to satellite signals received respectively, demodulation processing can be executed even thougha demodulator corresponding to each of GPS is not provided.

4 Claims, 4 Drawing Sheets

GPS RECEIVER AND METHOD THEREOF

BACKGROUND OF THE INVENTION

1. Field of the Invention

The present invention relates to a signal receiver of the Global Positioning System (GPS) and a demodulation processing control method, and more particularly, is suitably applied to such as a signal receiver of GPS for measuring the positioning of mobile units.

2. Description of the Related Art

Heretofore, in the GPS satellite signals to be transmitted respectively from the plural number of GPS satellites revolving about over the earth are received by the GPS signal receiver, and by analyzing said satellite signals received, the distance between said GPS signal receiver and each GPS satellite is obtained and based on this, the present position of the mobile unit is calculated.

The satellite signals to be transmitted from these GPS satellites are the signal spectrum diffused by the pseudo noise (PN) code formed of a series of codes of different types in each GPS satellite.

Accordingly, the GPS signal receiver can generate local PN codes corresponding respectively to multiple kinds of GPS satellites, and secures synchronism by matching the phases of the local PN codes generated with the phase of the PN code of the satellite signal. And after adding synchronism by tracking the satellite signal by applying an inverse spread spectrum processing, the GPS signal receiver demodulates the navigation message (such as orbit information for positioning measurement) from the GPS satellite.

For example, as shown in FIG. 1, the GPS signal receiver 1 receives satellite signals S1 to S4 to be transmitted from the plural number of the first GPS satellite 2 to the fourth GPS satellite 5 via a GPS antenna 6 and a signal receiver circuit 7, and supplies the satellite signal S1 to the first demodulator 8, the satellite signal S2 to the second demodulator 9, the satellite signal S3 to the third demodulator 10, and the satellite signal S4 to the fourth demodulator 11.

The first demodulator 8 to the fourth demodulator 11, after acquiring synchronism and adding synchronism to the satellite signals S1 to S4, applies the inverse spread spectrum processing, and demodulates the satellite signals S1 to S4. And as well as transmitting the demodulation result data S5 to S8 to the circuit of the latter stage (not shown in Fig.), the first demodulator 8 to the fourth demodulator 11 transmit these to the control circuit 12.

The control circuit 12 assumes the demodulation condition of the first demodulator 8 to the fourth demodulator 11 based on the demodulation result data S5 to S8 to be supplied from the first demodulator 8 to the fourth demodulator 11, and by supplying the demodulation control signals S11 to S14 according to said demodulation condition to the first demodulator 8 to the fourth demodulator 11, it controls the demodulation condition in the first demodulator 8 to the fourth demodulator 11.

With this arrangement, the GPS signal receiver 1 calculates the distance between multiple GPS satellites by demodulating satellite signals S1 to S4 from the first GPS satellite 2 to the fourth GPS satellite 5 at the first demodulator 8 to the fourth demodulator 11 in parallel respectively. And based on the distance relation between these, the current position will be measured.

In the GPS signal receiver 1 thus constructed, since synchronism acquisitions are conducted to satellite signals S1 to S4 from the first GPS satellite 2 to the fourth GPS satellite 5 respectively, it is required to have the same number of demodulators as the number of GPS satellites existing in the signal receivable range (the first demodulator 8 to the fourth demodulator 11) or more than that number of demodulators. And this has created a problem that the circuit construction has become large-sized.

Moreover, since the GPS signal receiver 1 operates the first demodulator 8 to the fourth demodulator 11 simultaneously in parallel as shown in FIG. 3B, it has created a problem that the consumption of electric power has increased.

SUMMARY OF THE INVENTION

In view of the foregoing, an object of the invention is to provide a signal receiver of GPS with small sized and consuming few electric power and demodulation processing control method.

The foregoing object and other objects of the invention have been achieved by the provision of a signal receiver of GPS. Satellite signals to be transmitted are received from multiple satellites respectively in the GPS and the demodulation processing of the satellite signals by means of demodulation means is time division controlled based on the demodulation timing to each of said satellite signals received. In this way, the demodulation processing can be executed without providing the demodulator corresponding to each of satellites.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
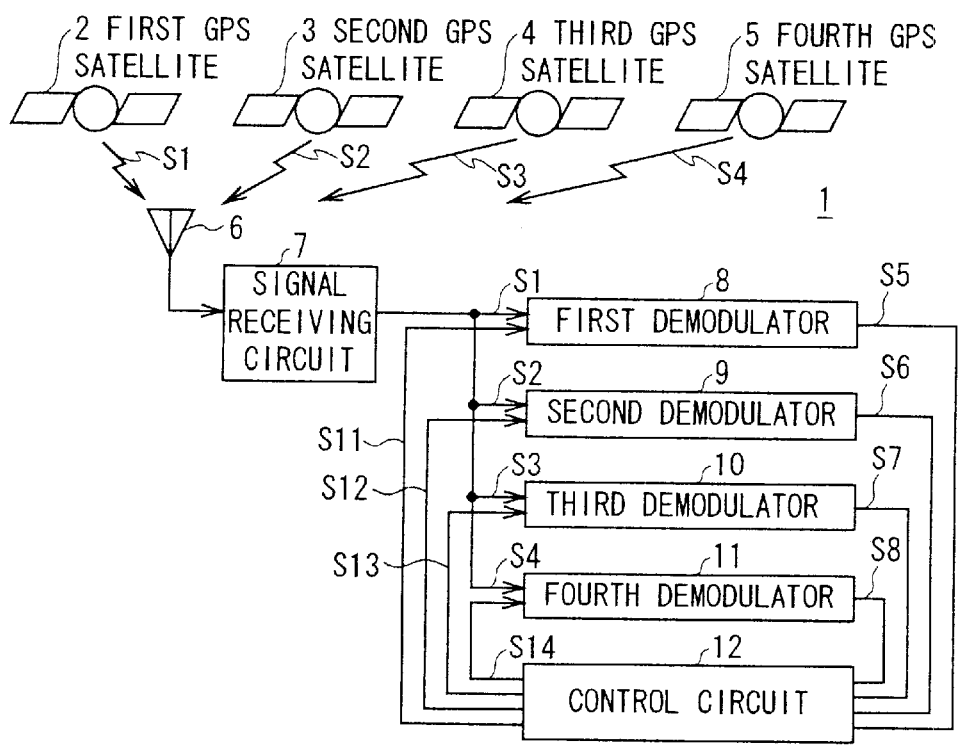
FIG. 1 is a block diagram showing the construction of a conventional GPS signal receiver.
Figure 2:
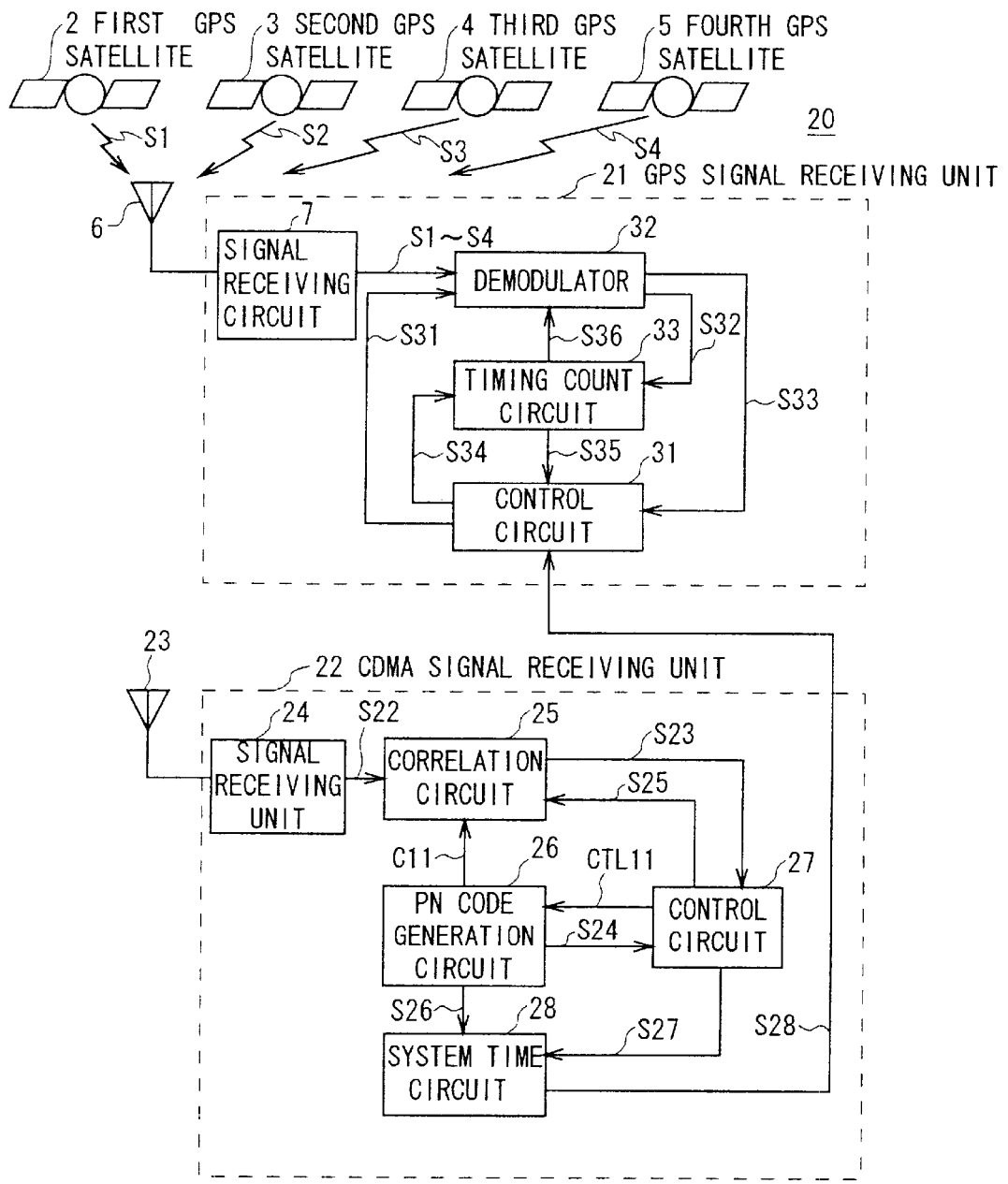
FIG. 2 is a block diagram showing the construction of a GPS signal receiver according to the present invention.

Preferred embodiments of this invention will be described with reference to the accompanying drawings:

In FIG. 2, in which corresponding parts of FIG. 1 are designated the same reference numerals, 20 generally shows a GPS signal receiver as GPS according to the present invention. And this GPS signal receiver comprises roughly a GPS signal receiving unit 21 for receiving satellite signals S1 to S4 to be transmitted from four types of satellites, the first GPS satellite 2 to the fourth satellite 5, and a CDMA signal receiving unit 22 for receiving the spread spectrum signal S22 to be transmitted from the base station of the code division multiple access (CDMA) cellular system according to the direct sequence (DS) system conformed with the TIA/IS95 standard in the united states of America.

The CDMA signal receiving unit 22 enters the spread spectrum signal S22 received via the CDMA antenna 23 and the signal receiver circuit 24 into the correlation circuit 25.

The correlation circuit 25 comprises a shift register and a multiplier, and calculates the correlation value S23 by multiplying the local PN code C11 supplied from the PN code generation circuit 26 by the spread spectrum signal S22 and outputs this to the control circuit 27.

When the correlation value S23 is lower than the predetermined threshold value, the control circuit 27 judges that the PN code of the spread spectrum signal S22 and the local PN code C11 generated at the PN code generation circuit 26 are not in synchronism, and offset controls the phase of the local PN code C11 by supplying a phase control signal CTL11 to the PN code generation circuit 26.

The PN code generation circuit 26 offsets the phase of the local PN code Cll based on the phase control signal CTL11, and outputting the resultant local PN code C11 of which the phase is offset to the correlation circuit 25, returns the phase result information S24 showing the phase condition of the local PN code C11 to the control circuit 27.

Accordingly, when the control circuit 27 judges that the synchronism has not been acquired based on the correlation value S23 from the correlation circuit 25, generates the phase control signal CTL11 according to the phase result information S24, and by outputting this to the PN code generation circuit 26, successively offsets phases of the local PN code C11 by said PN code generation circuit 26 and outputs these.

Furthermore, when the correlation value S23 exceeds the predetermined threshold value, the control circuit 27 judges that the PN code of the spread spectrum signal S22 and the local PN code C11 generated at the PN code generation circuit 28 are in synchronism and supplements the synchronization.

At this point, the control circuit 27 informs that the synchronism acquisition is completed to the PN code generation circuit 26 by the phase control signal CTL11 and simultaneously, forms a demodulation control signal S25 showing the head timing of cycle of the PN code of the spread spectrum signal S22 at the time of data demodulation and transmits this to the correlation circuit 25.

The correlation circuit 25 comprises a demodulator (not shown in Fig.) inside in addition to a shift register and a multiplier, and by conducting the inverse-spread process onto the spread spectrum signal S22 based on the demodulation control signal S25 by said demodulator, demodulates the transmission data to be transmitted from the base station.

When the PN code generation circuit 26 recognizes the synchronism acquisition by the phase control signal CTL11 from the control circuit 27, it supplies the synchronism acquired timing, i.e., the code timing signal S26 showing the head timing of cycle in the PN code of the spread spectrum signal S22, to the system time circuit 28 formed of counter.

The system time circuit 28, resetting the counter at the timing synchronized with the code timing signal S26 to be supplied from the PN code generation circuit 26 according to the system time control signal S27 from the control circuit 27, forms a system time signal S28 and transmits this to the controller circuit 31 of the GPS signal receiving unit 21.

At this point, the base station of the CDMA cellular system receives the satellite signal to be transmitted from either of the first GPS satellite 2 to the fourth GPS satellite 5. And since CDMA system time that becomes the reference when forming the spread spectrum signal S10 based on the GPS time obtained by analyzing said satellite signal, the GPS system time and the CDMA time are in synchronism per the fixed timing.

The controller circuit 31 of the GPS signal receiving unit 21 is formed of Central Processing Unit (CPU), and by entering the system time signal S28, it can roughly recognize the head timing of cycle in the PN code of the satellite signal S1 transmitted from such as the first GPS satellite 2 and arrives the first based on said system time signal S28.

Furthermore, the controller circuit 31 of the GPS signal receiving unit 21 supplies the local PN code corresponding to the first GPS satellite 2 to the demodulator 32 by the demodulation control signal S31. Here, the demodulator 32 comprises a correlation circuit (not shown in Fig.) inside, and by calculating the correlation value within the searching range for several chips (or several tens of) before and after the head timing of cycle in the PN code of the satellite signal S1 via the correlation circuit, can demodulate the satellite signal S1 in a short time after conducting the synchronism acquisition.

As a result, the demodulator 32 obtains the synchronism acquisition timing of when the synchronization is actually acquired, and transmits this to the timing count circuit 33 as a synchronism acquisition timing signal S32. The timing count circuit 33 sets the count value at the demodulation timing per chip when the satellite signal S1 of the first GPS satellite 2 is synchronism acquired such as to "0" and memorizes this in the memory.

Then, the controller circuit 31 of the GPS signal receiving unit 21 successively supplies the local PN codes corresponding to the second GPS satellite 3, the third GPS satellite 4 and the fourth GPS satellite 5 respectively to the demodulator 32 by the demodulation control signal S31, and successively obtains the synchronism acquisition timing of the time when the synchronism is acquired via said demodulator 32, and transmits these to the timing count circuit 33 as the synchronism acquisition timing signal S32.

The timing count circuit 33 counts the synchronism acquisition timing per chip when the satellite signals S2 to S4 of the second GPS satellite 3 to the fourth GPS satellite 5 are synchronism acquired from the demodulator 32 as the count value respectively, and memorizes timing differential values between the counter value "0" to the satellite signal S1 in the internal memory respectively as the demodulation timing respectively. And by using these demodulation timings to the synchronism acquisition of satellite signals S2 to S4, the synchronism acquisition can be conducted to the satellite signals S2 to S4 of the second GPS satellite 3 to the fourth GPS satellite 5 in a short period of time from the next time.

The demodulator 32, by demodulating the satellite signal S1, transmits the absolute time information, that is common to the first GPS satellite 2 to the fourth GPS satellite 5 as the demodulation result data S33 to the controller circuit 31.

The controller circuit 31 is constantly supplied with the reference timing signal S3 per unit of 1 msec from the timing count circuit 33. And based on the absolute time information of said reference timing signal S35 and the demodulation result data S33, it outputs the shift timing per unit of 1 msec set in advance for shifting the demodulation processing to the following satellite signal S2 to the timing count circuit 33 as the shift control signal S34.

At the same time, the controller circuit 31 outputs the local PN code corresponding to the satellite signal S2 to be arrived from the second GPS satellite 3 and the shifting command of the demodulation processing to the demodulator 32.

When the shift control signal S34 is supplied from the controller circuit 31, the timing count circuit 33 reads out the demodulation timing to the satellite signal S2 from the internal memory, and outputs the time division shift timing signal S36 per chip corresponding to the demodulation timing to the demodulator 32.

Thus, the demodulator 32 conducts the synchronism acquisition of the satellite signal S2 using the local PN code corresponding to the second GPS satellite 3 for example, and obtains the demodulation result.

Figure 3:
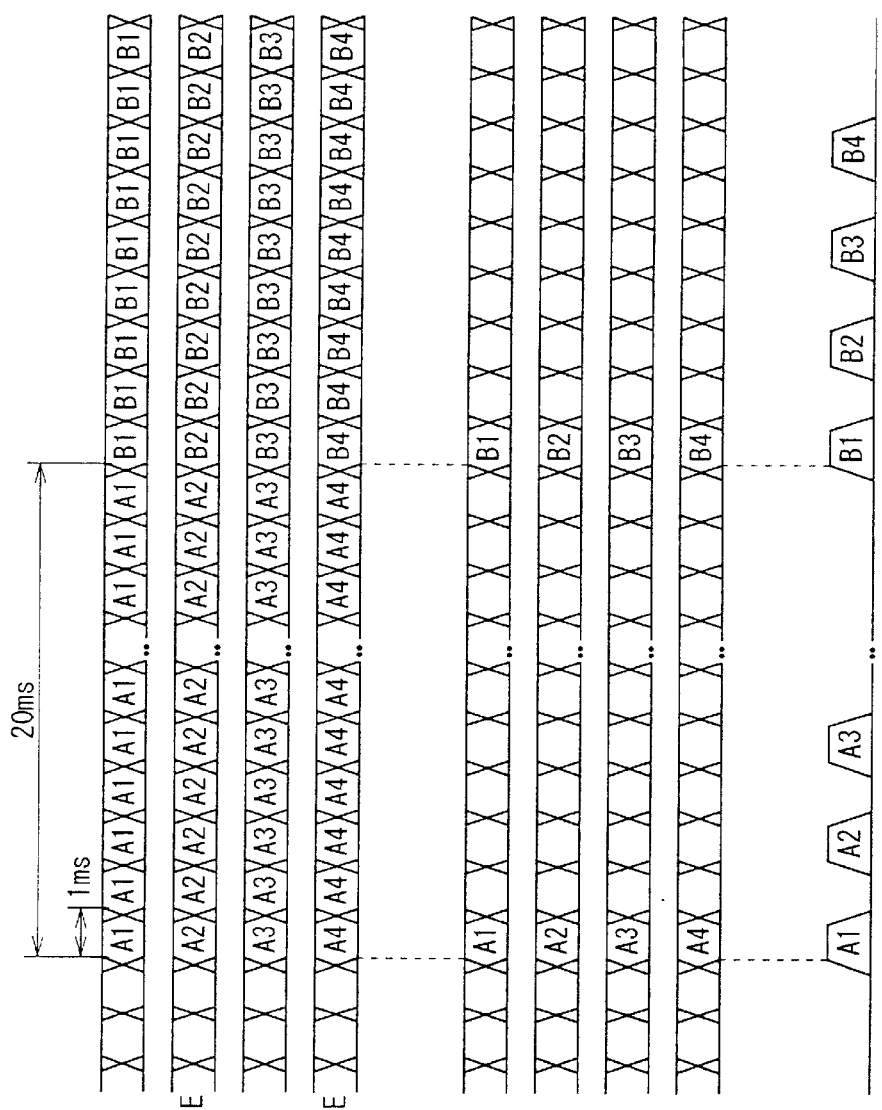
FIGS. 3A to 3C are timing charts showing the demodulation timing.
Figure 4:
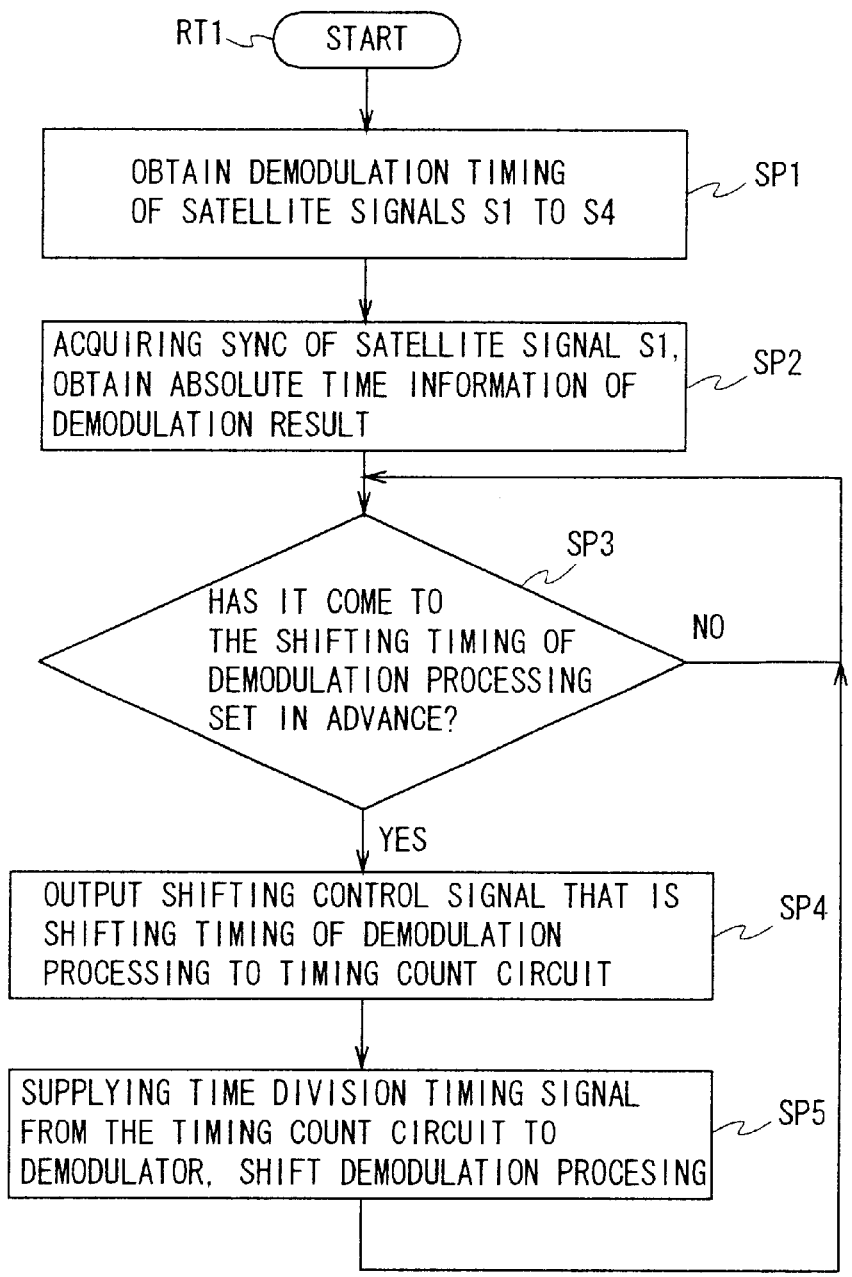
FIG. 4 is a flow chart showing the shift control processing procedure of the demodulation processing.

At this point, as shown in FIG. 3A, satellite signals S1 to S4 are transmitted at the transmission speed of 50 bps and 1 bit having the same contents is repeatedly transmitted at 20 msec, 20 times of each PN code (1 cycle is 1 msec) in each satellite signal S1 to S4.

Accordingly, since the GPS signal receiver 20 can obtain the demodulation result if it demodulates the data of 1 bit (A1) for 1 msec which is repeatedly being transmitted during 20 msec as shown in FIG. 3C, the demodulation processing to the satellite signals S1 to S4 will be conducted according to the time division per 1 msec by the demodulator 32.

With this arrangement, in the GPS signal receiver 20, since it is sufficient to conduct the time division demodulation onto satellite signals S1 to S4 per 1 msec out of 20 msec by the demodulator 32 without needing the number of demodulators corresponding to the number of the first GPS satellite 2 to the fourth GPS satellite 5 or more than that number, the circuit construction can be simplified and simultaneously the consumption of electric power can be further reduced.

In this GPS signal receiver 20, the time difference of the arrival times between satellite signal S1 to satellite signal S4 occurs as offset per chip (i.e., timing shift).

Thus, even if the GPS signal receiver 20 set the distance between the timing to demodulate the data (A2), the timing to demodulate the data (A3), and the timing to demodulate the data (A3) per 1 msec when shifting the demodulation processing from the satellite signal S1 to the demodulation processing of the satellite signal S2, and shifting the demodulation processing of the satellite signal S2 to the demodulation processing of the satellite signal S3 as shown in FIG. 3C, the difference per chip will occur.

Accordingly, the controller circuit 31 of the GPS signal receiver 20 control the offset per chip when shifting the demodulation processing in order to become the minimum corresponding to the demodulation timing to each of satellite signals S2 to S4 memorized in the internal memory of the timing count circuit 33.

More specifically, the controller circuit 31 of the GPS signal receiver 20 time division controls the demodulation processings in order from the first GPS satellite 2 existing at the closest distance to the fourth GPS satellite 5 existing at the distance farther away. Thus, the distance of the timing to shift the demodulation processing of the satellite signals S1 to S4 can be shortened as short as nearly 1 msec and the demodulation processing can be efficiently executed within 20 msec.

Next, the shifting control processing procedure of the demodulation processing in the GPS signal receiver 20 will be explained. The controller circuit 31 of the GPS signal receiver 20 enters from the starting step of the routine RT1 and moves to the step SP1.

At the step SP1, the controller circuit 31, after conducting the synchronism acquisition of the satellite signal S1 of the first GPS satellite 2 based on the system time signal S28 supplied from the CDMA signal receiving unit 22, successively conducting the synchronism acquisition of satellite signals S2 to S4, obtains synchronism acquisition timing, and memorized this in the internal memory of the timing count circuit 33 as the demodulation timing and then, moved to the following step SP2.

At the step SP2, the controller circuit 31 obtains an absolute time information of the demodulation result after synchronism acquiring the satellite signal S1 of the first GPS satellite 2 based on the demodulation timing to satellite signals S1 to S4 memorized in the internal memory of the timing count circuit 33, and moves to the following step SP3.

At the step SP3, the controller circuit 31 judges whether the preset shifting timing of the demodulation processing has come or not based on the reference timing signal S35 per 1 msec to be supplied from the absolute time information and the timing count circuit 33.

At this point, if a negative result is obtained, this shows that the preset shifting timing of the demodulation processing has not come, and at this moment, the controller circuit 31 returns to the step SP3 and waits till the preset shifting timing of the demodulation processing arrives.

On the other hand, if an affirmative result is obtained at the step SP3, this show that the preset shifting timing of the demodulation processing has come, and at this moment, the controller circuit 31 moves to the following step SP4.

At the step SP4, the controller circuit 31 outputs the shift control signal S34, that is the shift timing of the demodulation processing, to the timing count circuit 33 and simultaneously, outputs the local PN code corresponding to the satellite signal S2 to be arrived from the second GPS satellite 3 by the demodulation control signal S31 and the shift command of the demodulation processing to the demodulator 32, and moves to the following step SP5.

At the step SP5, the controller circuit 31, supplying the time division shift timing signal S36 from the timing count circuit 33 to the demodulator 32, shifts the demodulation processing and returning to the step SP3, repeats the processing described above.

According to the foregoing construction, since the GPS signal receiver 20 receives satellite signals S1 to S4 of the first GPS satellite 2 to the fourth GPS satellite 5 by the GPS antenna 6 and the signal receiving circuit 7 as the signal receiving means, and conducts the time division demodulation processing onto the satellite signals S1 to S4 per 1 msec in 20 msec by the demodulator 32 as the demodulation means, the circuit construction can be simplified and further mini-sized, and also the consumption of the electric power can be further reduced by the time division demodulation processing.

Furthermore, the GPS signal receiver 20, by time division controlling the demodulation processing in order from the first GPS satellite 2 existing at the closest distance to the fourth GPS satellite 5 existing at the distance leaving farther away according to the demodulation timing of satellite signals S1 to S4 memorized in the internal memory of the timing count circuit 33, can execute the demodulation processing within 20 msec efficiently by making the timing distance of sequentially shifting the demodulation processing of satellite signal S1 to S4 as short as possible.

According to the foregoing construction, the GPS signal receiver 20 conducts the time division demodulation processing onto satellite signals S1 to S4 per 1 msec in 20 msec based on the demodulation timing of satellite signal S1 to S4 memorized in the internal memory of the timing count circuit 33 in advance. Thus, the circuit construction can be simplified and further mini-sized, and the consumption of electric power can be further reduced by the time division demodulation processing.

The embodiment described above has dealt with the case of conducting the demodulation processing of the satellite signals S1 to S4 only by the demodulator 32 in time sharing system after receiving satellite signals S1 to S4 from 4 kinds of satellites, the first GPS satellite 2 to the fourth GPS satellite 5. However, the present invention is not only limited to this but also the demodulation processing of satellite signals from 6 kinds or 8 kinds of GPS satellites can be conducted by the demodulator 32 in time sharing system. Or the plural number of demodulators 32 can be provided and the demodulation processing of satellite signals from 8 kinds or 12 kinds of GPS satellites can be conducted in time sharing system. In this case, the same effects as those of the above embodiment can be obtained.

Furthermore, the embodiment described above has dealt with the case of recognizing roughly the head timing of cycle in the PN code of the satellite signal S1 received from the first GPS satellite 2 based on the system time signal S28 detected by the CDMA signal receiving unit 22 loaded on the GPS signal receiver 20 and conducting the synchronism acquisition in a short time. However, the present invention is not only limited to this but also the satellite signal S1 received from the first GPS can be acquired synchronism without receiving the supply of the system time signal S28 from the CDMA signal receiving unit 22. In this case, there is a possibility of taking more time for synchronism acquisition. However, since the CDMA signal receiving unit 22 is no longer needed, the circuit construction can be simplified.

Furthermore, the embodiment described above has dealt with the case of time division demodulation processing the satellite signals S1 to S4 per 1 msec. However, the present invention is not only limited to this but also the satellite signals can be time division demodulation processed per 2 msec, or 3 msec. And furthermore, the demodulation processing time can be optionally changed, such as the satellite signal S1 will be demodulation processed for 1 msec, the satellite signal S2 will be demodulation processed for 2 msec, the satellite signal S3 will be demodulation processed for 4 msec, and the satellite signal S4 will be demodulation processed for 6 msec.

Accordingly, in the GPS signal receiver 20, by optionally changing the demodulation processing time, accuracy of the demodulation result of each of satellite signals S1 to S4 can be increased and the error rate can be decreased, and thus results in improvement of the signal receiving characteristics.

Furthermore, the embodiment described above has dealt with the case of loading the CDMA signal receiving unit 22 in the GPS signal receiver 20. However, the present invention is not only limited to this but also the GPS signal receiver 21 can be loaded on a portable telephone of the CDMA system.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A signal receiver for a global positioning system comprising:

signal receiving means for receiving satellite signals transmitted from multiple satellites respectively in the global positioning system;

demodulation means for conducting demodulation processing of said satellite signals received by said signal receiving means; and control means for time division controlling said demodulation processing by said demodulation means based on a demodulation timing of each of said satellite signals, wherein said control means performs said time division control by shifting said demodulation processing in order from said satellite signal of said satellite existing at a closest distance to said satellite signal of said satellite existing at a distance farthest away based on said demodulation timing.

2. The signal receiver for a global positioning system according to claim 1 wherein said control means obtains said timing for said demodulation processing by conducting synchronism acquisition with respect to each said satellite signal based on a timing of a transmission signal from a base station of a communication system synchronized with each said satellite signal.

3. A demodulation processing method comprising:

a signal receiving step for receiving satellite signals transmitted from multiple satellites in a global positioning system; and a control step for time division controlling demodulation processing of said satellite signals based on a demodulation timing with respect to said satellite signals received at said signal receiving step, respectively, wherein said control step performs said time division control by shifting said demodulation processing in order from said satellite signal of said satellite existing at a closest distance to said satellite signals of said satellite existing at a distance farthest away based on said demodulation timing.

4. The demodulation processing control method according to claim 3 wherein said control step obtains said demodulation timing by conducting synchronism acquisition with respect to each said satellite signal based on a timing of a transmission signal from a base station of a communication system synchronized with each said satellite signal.

* * * * *